Oct. 18, 1955  A. L. JONES  2,720,977
THERMAL DIFFUSION APPARATUS
Filed Feb. 27, 1952
FIG.1.
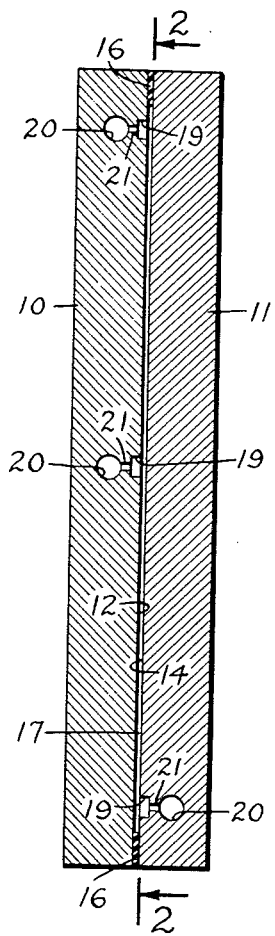
FIG.2.
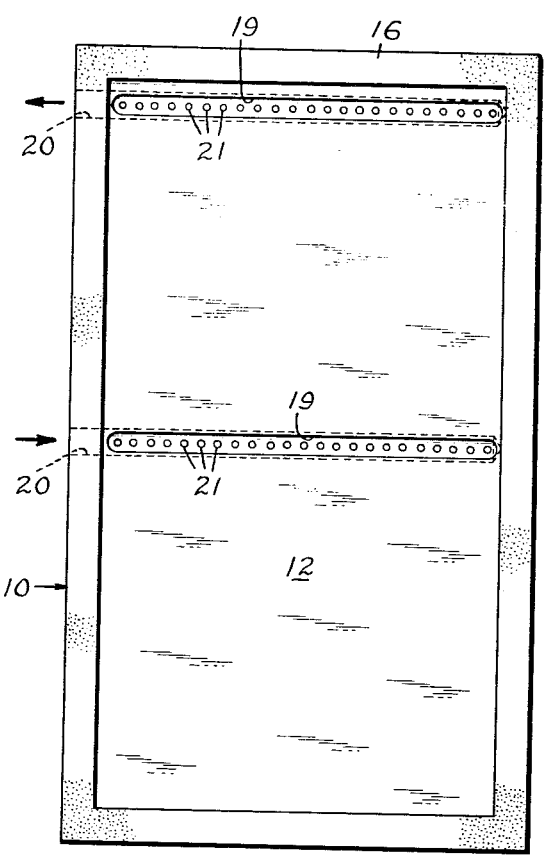
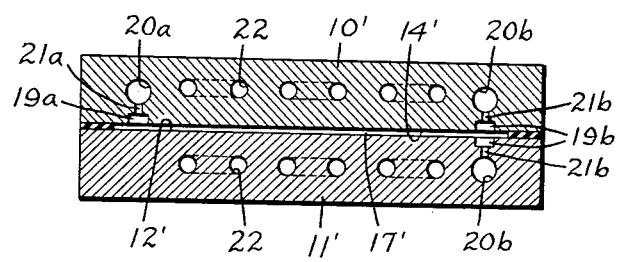
FIG.3.
INVENTOR.
ARTHUR LETCHER JONES
BY
Campbell, Brumbaugh, Free & Graves
HIS ATTORNEYS.

United States Patent Office 2,720,977
Patented Oct. 18, 1955

2,720,977

THERMAL DIFFUSION APPARATUS

Arthur Letcher Jones, Lyndhurst, Ohio, assignor to The Standard Oil Company, Cleveland, Ohio, a corporation of Ohio Application February 27, 1952, Serial No. 273,739

4 Claims. (Cl. 210—52.5)

The present invention relates to new and useful improvements in apparatus for separating liquid mixtures by continuous thermal diffusion.

It has been known for some time that it is possible to separate liquid mixtures into two or more dissimilar fractions by subjecting a thin film of liquid mixture to a temperature gradient. For many years this was accomplished in apparatus consisting essentially of two closely spaced, parallel walls forming a narrow slit and provided at each end of the slit with a reservoir having a volume considerably in excess of the volume of the slit. By filling such an apparatus with a liquid mixture and maintaining the opposed walls at different temperatures, the liquid in one reservoir becomes enriched in one component of the liquid mixture, and the liquid in the other reservoir becomes impoverished in said component or enriched in another component.

After many hours or several days, the liquids in the two reservoirs are separately withdrawn.

The amount of liquid that can be subjected to thermal diffusion in apparatus of this type is extremely small, being measured in tens of ccs., and the time and heat energy required is so great that the technique of separating liquid mixtures by thermal diffusion remained nothing more than a laboratory curiosity for some eighty years.

More recently it has been proposed, e. g., in Patents 2,541,069–071, to subject liquid mixtures to thermal diffusion by maintaining a temperature gradient across a narrow slit formed by closely spaced concentric or flat walls, and continuously passing a stream of the liquid mixture through the slit. It was found that by such means the rate of separation obtainable is much improved.

The slit widths of liquid thermal diffusion column are extremely narrow, i. e., less than about 0.15" and preferably less than about 0.06". When the flow of liquid within the columns is countercurrent, i. e., when the slit has a vertical component, the feed rate is low enough to permit thermal or convective circulation within and endwise of the columns so that one portion of the liquid moves upwardly adjacent the warmer wall and another descends adjacent the cooler wall, and the dissimilar fractions are withdrawn at opposite ends of the slit, it is preferable that the slit width be within the range of about 0.02 to about 0.06 inches. On the other hand, when the flow of liquid within the column is concurrent, i. e., when the feed rate exceeds the rate of thermal circulation, if any, and the dissimilar fractions are withdrawn at the same general portion but from adjacent opposite sides of the slit, there is, theoretically, no limit to the minimum slit width due to the absence of endwise thermal circulation within the slit. For practical considerations, however, the minimum slit width for concurrent flow is of the order of about 0.01".

Upon dismantling a thermal diffusion column of the center feed, countercurrent flow, vertical flat plate type, wherein the length of the slit was 5 ft., the breadth about 2 ft., and the slit width about 0.035", and wherein the liquid mixture was introduced into the slit through a line of small holes in the surface of one of the plates, the holes being spaced about ⅜ of an inch apart, and the dissimilar fractions were withdrawn through ports of identical construction located opposite ends of the slit, the surprising discovery was made that the surface of the hot wall between the inlet port and the withdrawal port at the top of the slit showed a series of fairly sharp, parallel and colored lines, each connecting one particular hole of the inlet port with one particular hole of the withdrawal port. A similar series of lines were found on the cold wall between the inlet port and the other withdrawal port. This indicated that although the efficiency of the column was already considerably higher than had heretofore been believed possible, apparently only a fraction of the surface of the column was being used effectively in the process.

It has now been found that it is possible to overcome this defect by providing liquid thermal diffusion apparatus with inlet and withdrawal ports at least one of which, preferably at least the inlet port, comprises an elongated groove in the face of the wall, a passage for liquid spaced from and substantially coextensive with the groove, preferably also parallel to the groove, and a plurality of holes between the groove and the passage, the passage communicating with the exterior of the apparatus.

While it is to be understood that the scope of the invention is not to be limited by any theory advanced herein, it is believed that the groove in the face of the wall has a flow equalizing function, that promotes the formation, between the inlet and withdrawal ports, of continuous films rather than series of parallel streams that are separated from one another by inactive areas in which little or no movement of liquid apparently takes place.

To further promote movement of the liquid between the inlet and withdrawal ports in the form of continuous films rather than series of parallel streams, the volumetric capacity of the groove forming part of each port constructed in accordance with the invention is sufficiently large in relation to the combined volumetric flow capacity of the holes. To assure substantially uniform flow through all the holes, the volumetric capacity of the passage is sufficiently large in relation to the combined volumetric flow capacity of the holes. The volumetric capacity of the passage and the groove should not, however, be so large as to delay unduly the displacement therefrom of liquid with which the passage and groove are initially filled upon commencement of the liquid thermal diffusion process, or hold up more than necessary, where the port is used as a withdrawal port, of the separated fraction during continued operation. The passage may be tapered to assist in uniform rates of flow through the various holes, especially if the volumetric proportion of the passage is relatively small. In addition, the positions of the holes connecting the groove with the passage are such as to promote a substantially uniform rate of flow of liquid into and out of all portions of the groove. This is preferably accomplished by spacing the holes substantially equidistantly along the length of the groove.

One of the primary advantages of this invention is that the efficiency of separation obtainable in a thermal diffusion apparatus of given dimensions is tremendously increased.

This and other advantages, as well as the utility of the invention, will become further apparent from the following detailed description made with reference to the accompanying drawing, wherein:

Figure 1 is a cross-sectional view of a vertical, center feed liquid thermal diffusion apparatus provided with an inlet port and two withdrawal ports, all illustrative of the invention;

Figure 2 is a cross-sectional view taken along section line 2—2 of Figure 1; and Figure 3 is a cross-sectional view of a horizontal, concurrent flow, end feed liquid thermal diffusion apparatus provided with inlet and withdrawal ports of this invention.

Referring now to Figures 1 and 2, the opposed walls 10 and 11 having wall faces 12 and 14, respectively, are substantially parallel, liquid impervious and stationary. The wall faces 12 and 14 are separated from one another a distance of less than about 0.15", preferably from about 0.02 to about 0.06" apart by one or more gaskets 16 to form a narrow slit 17. The walls 10 and 11 may be maintained in their position relative to one another by any suitable means, such as bolts extending through the walls and the gasket or gaskets adjacent the edges thereof.

Each of the inlet and withdrawal ports, shown in Figure 1 comprises an elongated groove 19 in the face of one of the walls, a passage 20 for liquid that is spaced from, parallel to and substantially coextensive with the groove 19, the passage communicating with the exterior of the apparatus, and a plurality of small, substantially equally distantly spaced holes 21 connecting the groove and the passage.

In operation, the liquid mixture to be subjected to thermal diffusion is introduced from the exterior of the apparatus through the passage 20 of the inlet port in the mid-portion of the slit 17. The liquid mixture passes through the holes 21 into groove 19, wherein the individual streams from the holes 21 recombine. A portion of the liquid mixture moves over the edge of the groove 19 upwardly along the wall 10 as a film rather than as a series of parallel streams, and another portion of the liquid moves downwardly along wall 11 likewise as a film. Both of these films are subjected to thermal diffusion and the fractions remaining adjacent the respective wall surfaces are withdrawn through the withdrawal ports at the opposite ends of the slit.

The apparatus illustrated by way of example in Figure 3, is a horizontal, concurrent, end feed liquid thermal diffusion apparatus wherein the wall faces 12' and 14' are preferably spaced apart a distance as small as about 0.01", liquid mixture is introduced by way of an inlet port comprising passage 20a, holes 21a and groove 19a at one end of the slit 17', and dissimilar fractions are withdrawn at the other end of the slit through withdrawal ports each comprising grooves 19b, holes 21b and passages 20b. The oppositely disposed walls 10' and 11' may be maintained at different temperatures by any suitable means, such as for example by circulating fluids through coils or the like, illustrated schematically at 22.

It is to be understood that various changes and modifications will readily occur to those skilled in the art upon reading this description. All such changes and modifications are intended to be included within the scope of the invention as defined in the appended claims.

I claim:

1. Liquid thermal diffusion apparatus comprising two substantially parallel, liquid-impervious, stationary walls having opposed smooth faces spaced apart a distance less than about 0.15 inch to form a substantially uniform narrow slit therebetween, means for relatively heating and cooling said walls to impose a temperature gradient across said slit, at least one of said walls having a pair of narrow grooves extending transversely thereof in its face, said grooves being spaced apart along said slit and substantially parallel, said one wall having a pair of passages corresponding to said grooves behind and substantially parallel with said grooves, said wall further having a row of closely spaced holes in it along the length of each groove extending from the bottom of each groove to, and connecting it to, its corresponding passage, an inlet from the exterior of said walls connected to one of said passages, an outlet to the exterior of said walls connected to the other passage and the other wall having at least one outlet therein communicating with said slit.

2. The thermal diffusion apparatus set forth in claim 1, in which the outlet in said other wall comprises another groove therein, said other wall having a passage behind and corresponding to said another groove and a row of holes spaced along the length of said another groove and connecting it to its corresponding passage along the length thereof.

3. The thermal diffusion apparatus set forth in claim 2, in which said grooves connected to and forming the outlets from said slit are disposed at one end of said slit.

4. The thermal diffusion apparatus set forth in claim 2, in which said grooves connected to and forming the outlets from said slit are disposed at opposite ends of said slit and on opposite sides of the groove connected to said inlet.

References Cited in the file of this patent

UNITED STATES PATENTS

| | | |
|---|---|---|
| 1,540,206 | Crickmer | June 2, 1925 |
| 2,160,838 | Dorr | June 6, 1939 |
| 2,161,785 | Lopez | June 13, 1939 |
| 2,521,112 | Beams | Sept. 5, 1950 |
| 2,541,069 | Jones et al. | Feb. 13, 1951 |
| 2,541,070 | Jones et al. | Feb. 13, 1951 |
| 2,541,071 | Jones et al. | Feb. 13, 1951 |